United States Patent [19]
Rizzi et al.

[11] Patent Number: 4,582,473
[45] Date of Patent: Apr. 15, 1986

[54] POLYMER PELLETIZER

[75] Inventors: Marc A. Rizzi, Orange; James Cutarelli, Shelton, both of Conn.

[73] Assignee: USM Corporation, Farmington, Conn.

[21] Appl. No.: 624,388

[22] Filed: Jun. 25, 1984

[51] Int. Cl.⁴ .............................................. B29C 47/12
[52] U.S. Cl. ..................................... 425/225; 425/461
[58] Field of Search ............... 425/461, 462, 463, 464, 425/378 S, 379 S; 264/5, 138, 142

[56] References Cited

U.S. PATENT DOCUMENTS

| | | | |
|---|---|---|---|
| 2,341,704 | 2/1944 | Ervin | 425/7 |
| 2,508,462 | 5/1950 | Marshall | 425/6 |
| 2,605,502 | 8/1952 | Culpepper et al. | 264/169 |
| 3,181,201 | 5/1965 | Seiz | 425/463 |
| 3,213,170 | 10/1965 | Erdmenger et al. | 264/142 |
| 3,309,734 | 3/1967 | Bynum et al. | 425/376 R |
| 3,792,950 | 2/1974 | Cuff | 425/464 |
| 4,070,138 | 1/1978 | Stanwood | 425/376 R |
| 4,189,455 | 2/1980 | Raganato et al. | 264/141 |

FOREIGN PATENT DOCUMENTS 974125  2/1951  France ................................. 425/461

Primary Examiner—Willard E. Hoag
Attorney, Agent, or Firm—Aubrey C. Brine

[57] ABSTRACT

A pelletizing apparatus is provided with a first passage through which a strand of liquified plastic is fed to a die face. A second passage intersects the first at a point closely spaced from the die face and conducts a stream of pressurized fluid. The end of the strand of plastic forms a plug blocking continued passage of the polymer. Build-up of pressure of the fluid overcomes the blocking force of the plug, cutting the strand at the intersection and ejecting the plug as a pellet. Release of the fluid pressure permits the plastic strand to advance and block the exit whereupon the fluid pressure builds up to again eject the plug. Repeated self-regulating cycles cause a stream of pellets to be formed.

4 Claims, 8 Drawing Figures

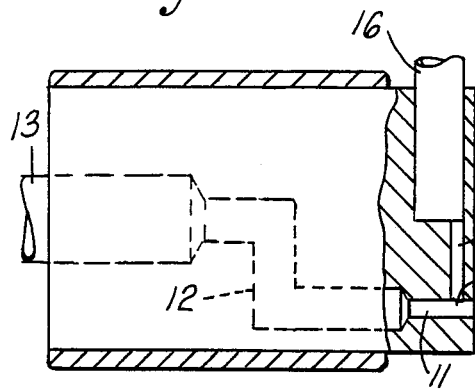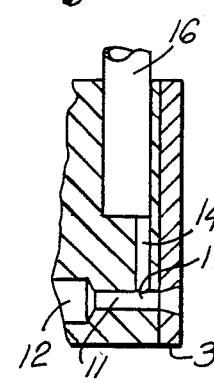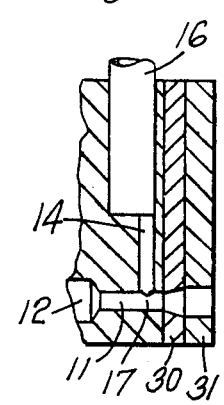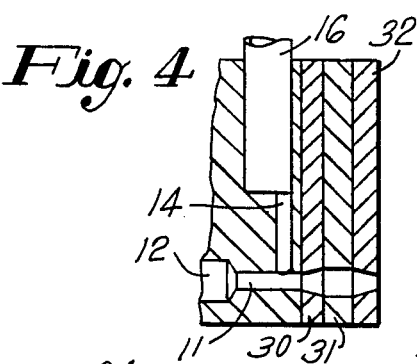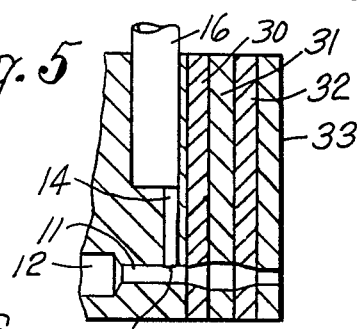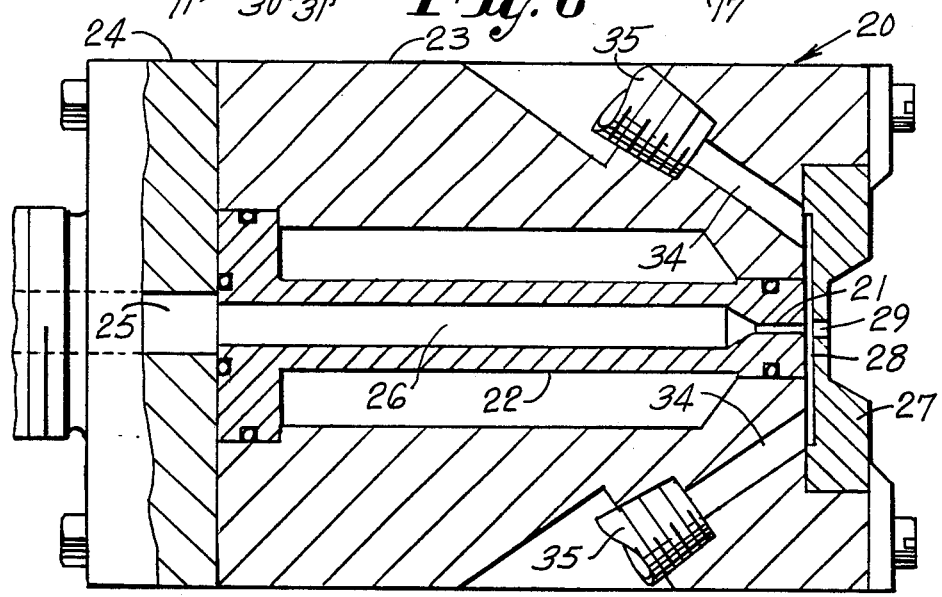

POLYMER PELLETIZER

FIELD OF THE INVENTION

This invention relates to apparatus for pelletizing plastic.

BACKGROUND OF THE INVENTION

Plastic pelletizing apparatus presently available usually involves extruding melted plastic in multiple strands through a perforated die plate where the strands are cut by rotating knives. Such well-known apparatus is shown typically in U.S. Pat. No. 3,618,162. The rotating knives and perforated die plates cooperating therewith are subject to wear and must be changed frequently. Thus, the mechanisms containing the die plates and the rotating knives must be adapted to facilitate such replacement such as seen in U.S. Pat. No. 3,574,891. Also the planes of the rotating knives and the die plate must be aligned. Typical of such aligning or yielding compensating mechanisms are shown in U.S. Pat. Nos. 3,271,821, 3,292,212, 3,266,090 and 4,290,742.

Accordingly, it is a general object of the invention to provide simple apparatus which avoids the above problems and eliminates the need for rotating knives and mechanism to cut strands of extruded plastic.

SUMMARY OF THE INVENTION

A pelletizing apparatus is provided with a first passage through which a strand of liquified plastic is fed to a die face. A second passage intersects the first at a point closely spaced from the die face and conducts a stream of pressurized fluid. The end of the strand of plastic forms a plug blocking continued passage of the polymer. Build-up of pressure of the fluid overcomes the blocking force of the plug, cutting the strand at the intersection and ejecting the plug as a pellet. Release of the fluid pressure permits the plastic strand to advance and block the exit whereupon the fluid pressure builds up to again eject the plug. Repeated self-regulating cycles cause a stream of pellets to be formed.

DESCRIPTION OF THE DRAWINGS

FIG. 1 is a side elevation partly in section of a pelletizing device embodying the invention;

FIGS. 2 through 5 are alternate forms of the die face portion of the device of FIG. 1;

FIG. 6 is a side elevation partly in section illustrating an alternate form of a device embodying the invention;

DESCRIPTION OF THE PREFERRED EMBODIMENTS

Figure 7:
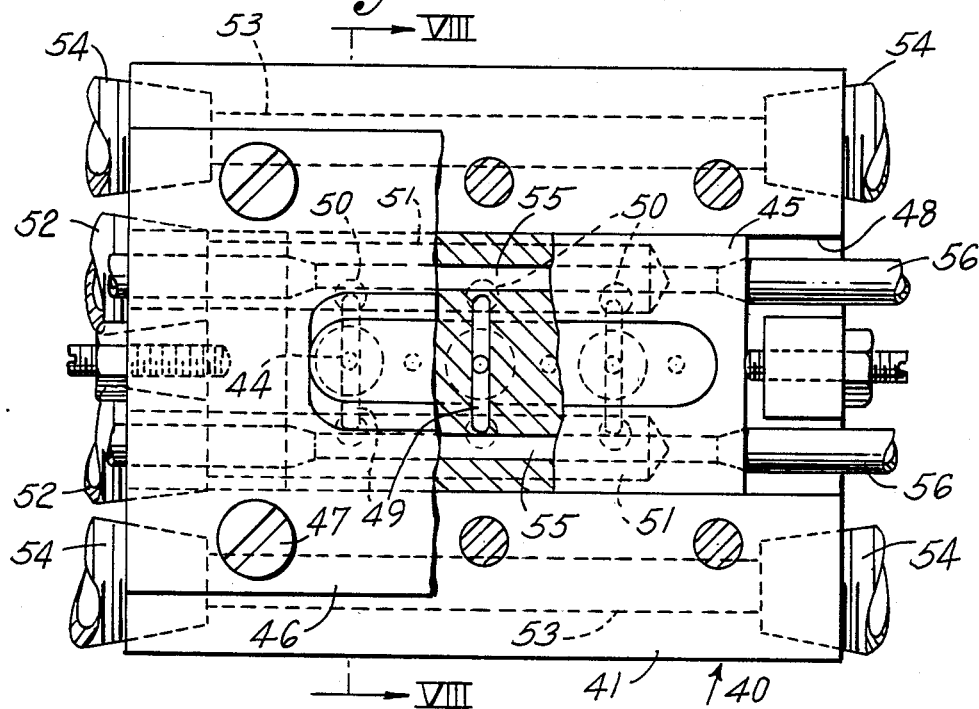
FIG. 7 is a front elevation with parts broken away illustrating an alternate form of the invention for pelletizing multiple strands of plastic.

Referring to FIG. 1 there is shown a pelletizing device 10 including a passage 11 connected by a conduit 12 to a pipe 13 leading from a source of plastic in liquid form. The plastic may be supplied to pipe 13 from any of a number of well known apparatus such as an extruder, reactor, plasticator or the like. The device also includes a passage 14 intersecting the passage 11 at a point 17 adjacent a die face 15 through which the passage 11 exits. The passage 14 is connected to a source of pressurized fluid such as air or other gas or water or other liquid by a pipe 16.

The plastic from a source such as an extruder may be supplied through pipe 13 at the melt or reaction temperature of the molten or otherwise liquid plastic to be pelletized. The passages 11 and 14 typically may be 0.125 inch in diameter with the intersection of the passages being spaced about 0.125 inch from the die face. In operation of the device, liquid plastic is fed along passage 11 in a strand to the die face where the end of the strand forms a plug stopping the strand of still liquid plastic. Pressure of the fluid fed through passage 14 then acts to sever the strand at the intersection 17 and eject lug from the die face 15. By release of the fluid the pressure drops sufficiently to permit the plastic strand to advance and form another plug which is then ejected by the fluid. The plastic strand thus is pelletized and fed into a water bath (not shown) for solidification and collection.

EXAMPLE I

A pelletizing head as shown in FIG. 1 was attached to the output of an extruder and low density polyethylene was fed through pipe 13 at rates varying from 0.8 to 7.1 pounds per hour. Air at temperatures ranging from room temperature and 350° F. and at a pressure of 110 psi was fed through pipe 16 and passage 14 into the stream of plastic at intersection 17. When sufficient air pressure was reached, the plastic stream was repeatedly cut and pellets of plastic were ejected from the die face at a high rate. It was found that as the feed rate of the plastic was increased, the pellet formation rate also increased while the pellet length remained about the same at 0.12 inch, the spacing of the intersection 17 from the die face 15. The same conditions were repeated but high pressure water was used instead of air. Pellets again were formed and it was found that the use of water was much quieter than air.

It was found that the resistance of the plastic plug varied with different plastic materials. Thus the resistance against ejection was varied by the use of one or of series of plates 30–33 having die hole designs in which combinations of diverging and converging or straight section geometries as seen in FIGS. 2–5 to vary back pressure and flow resistance suitable for plastics with differing viscosities.

Referring to FIG. 6, there is shown an alternate form of pelletizing device 20. The device is provided with a passage 21 formed in one end of an insert 22 received in a block 23. At the left end as seen in FIG. 6, the block 23 is secured to a flange 24 extending from the output end of a source of liquid plastic such as an extruder. The flange has a passage 25 aligned with a bore 26 communicating with the passage 21. At the right end as seen in FIG. 6, the block 23 is recessed to receive a die block 27 having a slot 28 adjacent the end of the insert 22 and communicating with the passage 21. The die block 27 also has an opening 28 aligned with the slot 28 and passage 21. The block 23 has two bores 34 connecting the ends of the slot 28 with pipes 35 leading from a source of pressurized fluid such as air or water. In the operation of the device 20, liquified plastic is fed along passage 25, bore 26 and passage 21 through the slot 28 to the die opening 29. In the same manner as in the device of FIG. 1, the end of the strand of plastic forms a plug in the opening 29. Pressurized fluid such as a gas or water is fed from the pipes 35, bores 34 and slot 28 and cuts the plastic strand and ejects the plug from the opening.

EXAMPLE II

Using the pelletizing device of FIG. 6, a low density polyethylene (LDPE) was fed along passage 21 at a temperature of 461° F. at a pressure of 1200 psi at a rate of 60 pounds per hour (maximum). Water at a temperature of 124° F. at 300 psi at a rate of 1.96 gallons per minute was fed through pipes 35, bores 34 and slot 28 into the strand of plastic. Again, plugs were repeatedly formed and ejected from the die opening 29 by the water pelletizing the plastic at the rate of extrusion.

EXAMPLE III

Using the same pelletizing device of FIG. 6 high density polyethylene (HDPE) at a melt temperature of 486° F. and pressure of 800 psi was pelletized at a rate of 19 lbs./hr. using water at a temperature of 98° F., pressure of 500 psi and rate of 3 gallons/min.

EXAMPLE IV

Using the same pelletizing device as in Example III, polypropylene (PROFAX 6528) was pelletized at a rate of 26 lbs./hr. at melt temperature of 415° F. and pressure of 400 psi. The water was used at a rate of 3 gallons/min., at 500 psi.

Figure 8:
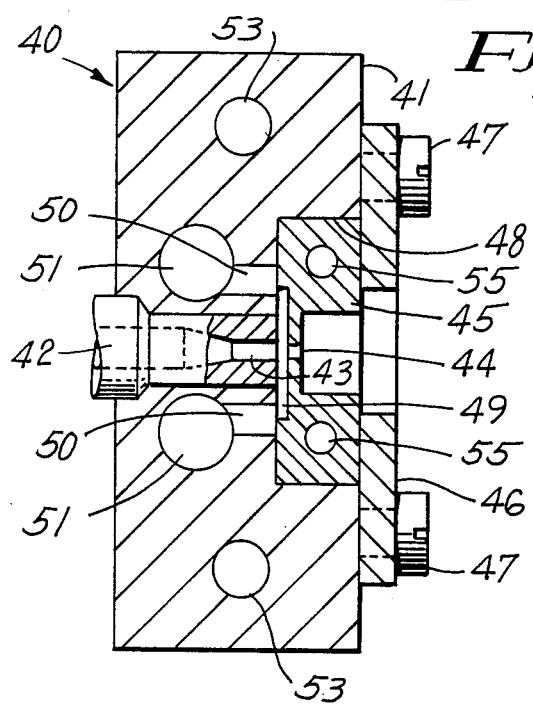
FIG. 8 is a section on line VIII—VIII of FIG. 7.

Referring to FIGS. 7 and 8, there is shown an alternate form of pelletizing device 40 for pelletizing multiple strands of plastic. The device includes a block 41 having inserts 42 each having a passage 43 for conducting liquified plastic from a source (not shown) to a coaxial die opening 44 in a die block 45. The die block is secured by a plate 46 and bolts 47 in a recess 48 in the block 41 and has a plurality of slots 49. Bores 50 in the block 41 lead from opposite ends of the slots to passages 51 connected by pipes 52 to a source of pressurized fluid such as air or water (not shown). In the same general manner as the device of FIG. 6, liquified plastic is fed through the passages 43 in the inserts 42, through the slots 49 and into the die openings 44 where plugs are formed. Pressurized fluid is fed to the ends of the slots 49 from the pipes 52 for severing the plastic strands and ejecting the plugging pellets from the openings 44. Passages 53 connected by pipes 54 to a source of temperature control fluid (not shown) maintain the pelletizing block at a temperature suitable for pelletizing the liquified plastic. In addition the die block 45 may be provided with bores 55 and pipes 56 for temperature control purposes.

It should be apparent from the foregoing description that a wide variety of thermoplastic and thermosetting plastic material may be pelletized using any suitable gaseous or liquid fluid to sever and eject the pellet without the use of costly perforated pellet plates and knives which must be sharpened and/or replaced frequently. Clearly, the devices described are shown by way of illustration and substitutions of various parts and combinations may be made without departing from the scope of the invention defined by the appended claims.

We claim:

1. An extrusion die having at least one passage which is continuously between a means for supplying a plastics material in an extrudable condition and an orifice in the face of said die, said passage having a restriction spaced from said face and a reduced diameter between said restriction and said face, and a second passage having an entrance in an exterior surface of said die and interesting said first passage between said restriction and said face, said die having means for connecting said passage with a source of fluid under pressure for ejecting plugs of plastics material from said first passage when they form in the first passage in the portion having a reduced diameter.

2. A device according to claim 1 in which multiple first and second passages are provided to pelletize multiple strands of plastic.

3. A device according to claim 1 in which the die face opening is defined by one or more shaped passages coaxial with the first passage to vary the resistance against ejection of the plug.

4. A device according to claim 1 in which said second passage intersects said first passage substantially at a 90° angle thereto.

* * * * *